United States Patent
Chung et al.

(10) Patent No.: US 12,542,607 B2
(45) Date of Patent: Feb. 3, 2026

(54) SYSTEM AND METHOD FOR VEHICLE-TO-VEHICLE RADIO COMMUNICATION USING ULTRAVIOLET C BAND

(71) Applicant: PUKYONG NATIONAL UNIVERSITY INDUSTRY-UNIVERSITY COOPERATION FOUNDATION, Busan (KR)

(72) Inventors: Yeonho Chung, Busan (KR); Sudhanshu Arya, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 348 days.

(21) Appl. No.: 18/142,856

(22) Filed: May 3, 2023

(65) Prior Publication Data
US 2023/0412269 A1    Dec. 21, 2023

(30) Foreign Application Priority Data
Jun. 15, 2022    (KR) .................... 10-2022-0072908

(51) Int. Cl.
*H04B 10/00*    (2013.01)
*H04B 10/079*   (2013.01)
*H04B 10/11*    (2013.01)

(52) U.S. Cl.
CPC ......... *H04B 10/11* (2013.01); *H04B 10/0795* (2013.01)

(58) Field of Classification Search
CPC ... H04B 10/11; H04B 10/112; H04B 10/1123; H04B 10/114; H04B 10/1143;
(Continued)

(56) References Cited

U.S. PATENT DOCUMENTS 3,284,633 A * 11/1966 Hathaway .............. H04B 10/54
                                                        398/163
5,301,051 A *  4/1994 Geller ................... H04B 10/114
                                                        398/118
(Continued)

OTHER PUBLICATIONS

Korean Office Action for related KR Application No. 10-2022-0072908 mailed Oct. 27, 2023 from Korean Intellectual Property Office.
(Continued)

*Primary Examiner* — Hanh Phan
(74) *Attorney, Agent, or Firm* — Paratus Law Group, PLLC

(57) ABSTRACT

There are provided a system and a method for vehicle-to-vehicle radio communication using an ultraviolet C band which enable vehicle-to-vehicle (V2V) communication by a wireless communication scheme using an ultraviolet C band (200 to 280 nm) to enhance safety of a vehicle operation. The system includes: a transmitter performing optical modulation for signal transmission when binary data for transmission is input, being driven to transmit the modulated optical signal, and transmitting a signal for vehicle-to-vehicle radio communication using an ultraviolet C band; and a receiver filtering an optical signal received through a UV lens, converting the filtered optical signal into a photon signal, and demodulating and recovering the photon signal.

10 Claims, 6 Drawing Sheets

(58) Field of Classification Search
CPC .............. H04B 10/1149; H04B 10/116; H04B 10/2575; H04B 10/25751; H04B 10/25752; H04B 10/25759; H04W 12/04; H04W 28/16
USPC ....... 398/118, 119, 127, 128, 129, 130, 131, 398/135, 136, 158, 159, 33, 38, 25, 26, 398/27, 115, 116, 117
See application file for complete search history.

(56) References Cited

U.S. PATENT DOCUMENTS

| | | | | |
|---|---|---|---|---|
| 8,041,224 | B2* | 10/2011 | Shpantzer | H10F 39/107 398/118 |
| 2015/0334563 | A1* | 11/2015 | Freda | H04W 12/50 398/115 |

OTHER PUBLICATIONS

Gang Chen et al., "Experimental demonstration of ultraviolet pulse broadening in short-range non-line-of-sight communication channels", Optics Express, May 10, 2010, pp. 10501-10509, vol. 18, No. 10.

Hamed Tadayyoni et al., "Ultraviolet Communications for Unmanned Aerial Vehicle Networks", IEEE Wireless Communications Letters, Jan. 2022, pp. 178-182, vol. 11, No. 1.

Camilo Lozoya et al., "Simulation study of a remote wireless path tracking control with delay estimation for an autonomous guided vehicle", Int J Adv Manuf Technol (2011), Jun. 5, 2010, pp. 751-761, vol. 52.

* cited by examiner

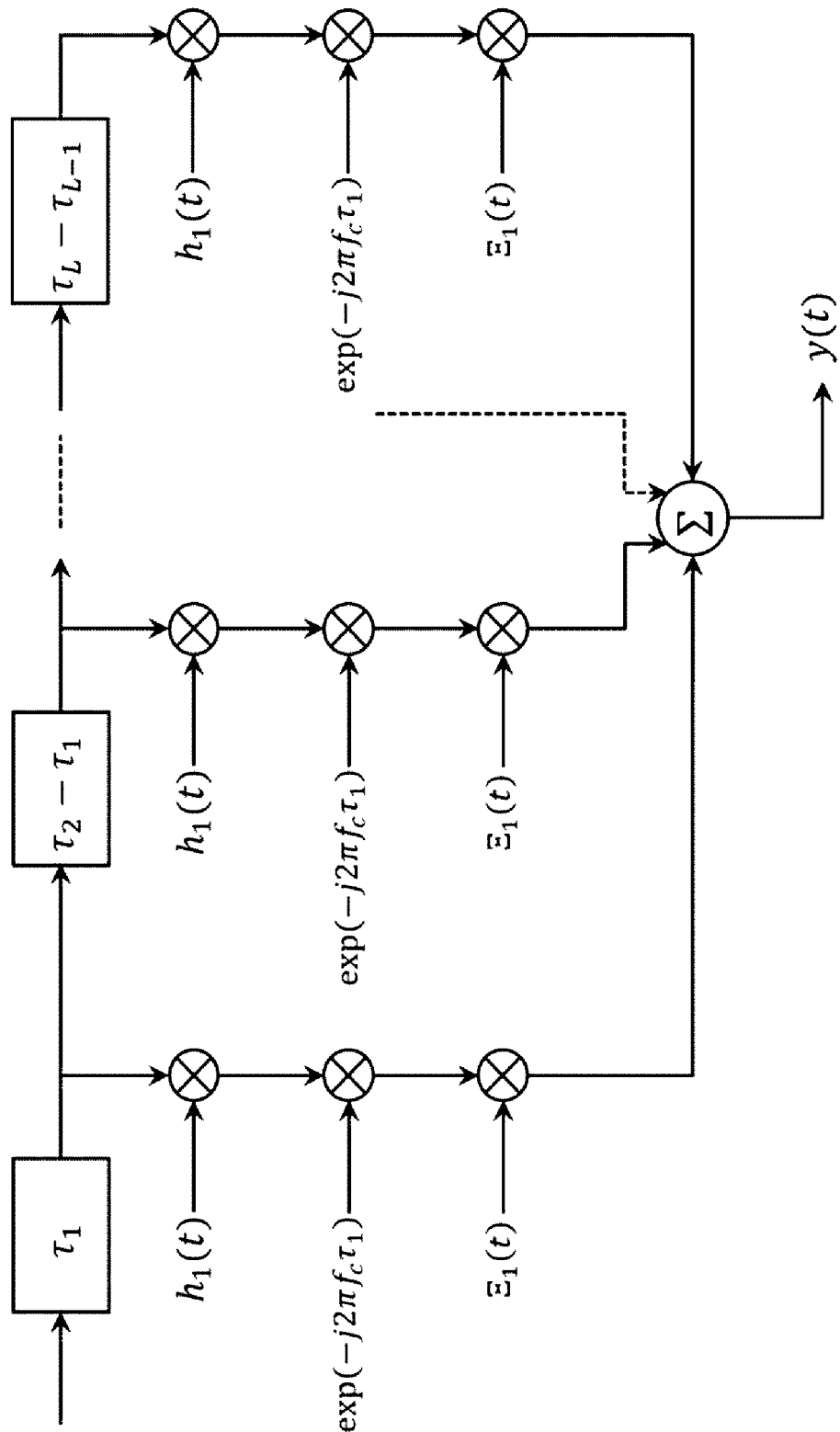

SYSTEM AND METHOD FOR VEHICLE-TO-VEHICLE RADIO COMMUNICATION USING ULTRAVIOLET C BAND

CROSS-REFERENCE TO PRIOR APPLICATION

This application claims priority to Korean Patent Application No. 10-2022-0072908 (filed on Jun. 15, 2022), which is hereby incorporated by reference in its entirety.

BACKGROUND

The present disclosure relates to vehicle-to-vehicle communication technology, and particularly, to a system and a method for vehicle-to-vehicle radio communication using an ultraviolet C band which enables vehicle-to-vehicle (V2V) communication by a wireless communication scheme using an ultraviolet C band (200 to 280 nm) to enhance safety of a vehicle operation.

Ultraviolet (UV) rays with a wavelength of 315 to 380 nm are defined as UV-A, UV rays with a wavelength of 280 to 315 nm are defined as UV-B, and UV rays with a wavelength of 200 to 280 nm are defined as UV-C, and the ultraviolet (UV) rays are often applied for sterilization of microorganisms in an environmental field.

However, there is also an attempt to apply UV to the Non-Line-of-Sight (NLOS) communication using scattering phenomena caused by the UV transmission.

Early studies used large light sources such as flash tubes, lamps, lasers, etc. as a light source of the UV, and aimed at long-distance communication of tens of kilometers or more.

However, in recent years, while light sources and detectors such as low-power and high-stability UV LEDs and an avalanche optical diode (APD) have been developed, a study for low-power short distance UV communication has been conducted.

The reason is that since the previous wireless RF communication has a relative power loss, and is sensitive to radio wave interference and jamming, the UV communication has a sufficient possibility as an alternative for complementing a shortcoming.

In particular, interest is increasing due to the appropriate application of short-range network composition requiring secret communication or other security such as military use.

Further, there is infrared communication used for a TV, a laptop, a digital camera, etc. as short-range wireless data communication, but a transmission/reception distance is too short, approximately 10 km, so it is considered that UV communication is appropriate in a middle-distance area of the infrared communication and the RF communication.

The UV communication primarily uses a UV-C band, and the reason is that since most UV-C signals from the sun are absorbed by an ozone layer of an upper layer part of the atmosphere, the signal in the UV-C band is very weak on the ground, and the UV communication is suitable for being used for low-noise communication.

Meanwhile, some communication technologies related to automobiles are known, and among them, some optical wireless communication (OWC) technologies are implemented, in addition to RF communication technologies.

These technologies have an emission of communication signals in a wide range of spatially extensive and evenly omnidirectional broadcast spectrums. Thus, the vehicle or infrastructure sent by the signal may not be able to identify the vehicle emitted from the plurality of vehicles emitting a communication signal, respectively.

In addition, due to the spread property of communication technologies implemented, the problem of electromagnetic pollution and bandwidth congestion is also highlighted.

Therefore, the development of a robust vehicle-to-vehicle communication technology of a new scheme to increase the safety of vehicle operation is required.

SUMMARY

The present disclosure is contrived to solve a problem of vehicle-to-vehicle communication technology in the related art, and the present disclosure provides a system and a method for vehicle-to-vehicle radio communication using an ultraviolet C band, which enables vehicle-to-vehicle communication by a wireless communication scheme using an ultraviolet C band (200 to 280 nm) where there is no interference from the light of the sun to enhance safety of a vehicle operation.

The present disclosure also provides a system and a method for vehicle-to-vehicle radio communication using an ultraviolet C band, which can implement a new vehicle-to-vehicle communication scheme using the ultraviolet C band by utilizing an advantage in that transmission/reception is enabled by a low-power and subminiature transceiver.

The present disclosure also provides a system and a method for vehicle-to-vehicle radio communication using an ultraviolet C band, which can secure the robustness of ultraviolet ray based vehicle-to-vehicle communication through a low-cost, high-efficiency, and subminiature transceiver by characterizing time-frequency selective fading and applying pathloss modeling and time-variance dynamic channel phenomenon estimation technology.

The present disclosure also provides a system and a method for vehicle-to-vehicle radio communication using an ultraviolet C band, which can implement a laser diode of an ultraviolet C band wavelength as a transmitter, and set an efficient non-line-of-sight (NLOS) communication link by using a photon multiplier tube (PMT) as a receiver positioned in a vehicle.

The present disclosure also provides a system and a method for vehicle-to-vehicle radio communication using an ultraviolet C band, which can alleviate basic requirements of pointing, acquisition, and tracking (PAT) which can be frequently shown in free space optical V2V communication by applying Kalman filtering for time-variance delay estimation, and provide a low-cost and low-power solution to the optical V2V communication.

The objects of the present disclosure are not limited to the aforementioned objects, and other objects, which are not mentioned above, will be apparent to a person having ordinary skill in the art from the following description.

In an aspect, a system for vehicle-to-vehicle radio communication using an ultraviolet C band includes: a transmitter performing optical modulation for signal transmission when binary data for transmission is input, being driven to transmit the modulated optical signal, and transmitting a signal for vehicle-to-vehicle radio communication using an ultraviolet C band; and a receiver filtering an optical signal received through a UV lens, converting the filtered optical signal into a photon signal, and demodulating and recovering the photon signal.

Here, the transmitter includes a data input processing unit processing binary data for data transmission, an optical modulator performing optical modulation for signal transmission, a driving unit allowing the optical modulator to transmit the modulated optical signal, and a UV transmission unit transmitting the signal for the vehicle-to-vehicle radio communication using the ultraviolet C band.

In addition, the receiver includes an optical bandpass filter filtering the optical signal received through the UV lens, a photon multiplier tube (PMT) converting the optical bandpass filtered optical signal into the photon signal, a demodulation unit demodulating a photon conversion signal, and a data recovery unit recovering data.

In addition, the receiver applies Kalman filtering for time variable delay estimation in order to alleviate requirements of pointing, acquisition, and tracking (PAT) in free space optical V2V communication.

In addition, the transmitter includes Q-switch quaternary harmonic wave neodymium doped yttrium aluminum garnet (ND:YAG) having a nominal center wavelength of 266 nm mounted on a corrected plate, and an average optical output of ND:YAG is 3.3 mJ, an overall angle beam width is 3 mrad, and a nominal pulse width of the transmitter is 3 ns.

In addition, the receiver adopts the photon multiplier tube (PMT), and is sealed in a shielding box integrated with a UV optical filter, and has a response time of 6 nm.

In addition, the receiver is configured by a 34 dB gain and 1.5 Ghz preamplifier, and a filter is disposed of in front of a sensing window of the PMT module.

In another aspect, a method for vehicle-to-vehicle radio communication using an ultraviolet C band includes: in order to build a mathematical model for vehicle-to-vehicle radio communication using an ultraviolet C band, performing an experimental campaign and measurement setup; processing data by a 2-stage Kalman strengthened super resolution tracking algorithm of a process equation and a measurement equation; measuring channel characteristics of different sites, and tracking an optical scattering signal over large time, and deriving a conclusion for a basic radio wave mechanism of an optical scattering based V2V communication link by analyzing a measurement result; and determining optimal conformity between measured data and a model.

The system and the method for vehicle-to-vehicle radio communication using an ultraviolet C band according to the present disclosure described above have the following effects.

First, vehicle-to-vehicle communication is enabled by a wireless communication scheme using an ultraviolet C band (200 to 280 nm) where there is no interference from the light of the sun to enhance safety of a vehicle operation.

Second, a new vehicle-to-vehicle communication scheme using the ultraviolet C band can be implemented by utilizing an advantage in that transmission/reception is enabled by a low-power and subminiature transceiver.

Third, the secure robustness of ultraviolet ray based vehicle-to-vehicle communication through a low-cost, high-efficiency, and subminiature transceiver can be secured by characterizing time-frequency selective fading and applying pathloss modeling and time-variance dynamic channel phenomenon estimation technology.

Fourth, a laser diode of an ultraviolet C band wavelength can be implemented as a transmitter, and an efficient non-line-of-sight (NLOS) communication link can be set by using a photon multiplier tube (PMT) as a receiver positioned in a vehicle.

BRIEF DESCRIPTION OF THE DRAWINGS

FIG. 6 is an expression configuration diagram of a baseband of a channel in the present disclosure.

DETAILED DESCRIPTION

Hereinafter, preferred embodiments of a system and a method for vehicle-to-vehicle radio communication using an ultraviolet C band according to the present disclosure will be described in detail as follows.

Features and advantages of the system and the method for vehicle-to-vehicle radio communication using an ultraviolet C band according to the present disclosure will be apparent through a detailed description of each exemplary embodiment below.

Figure 1:
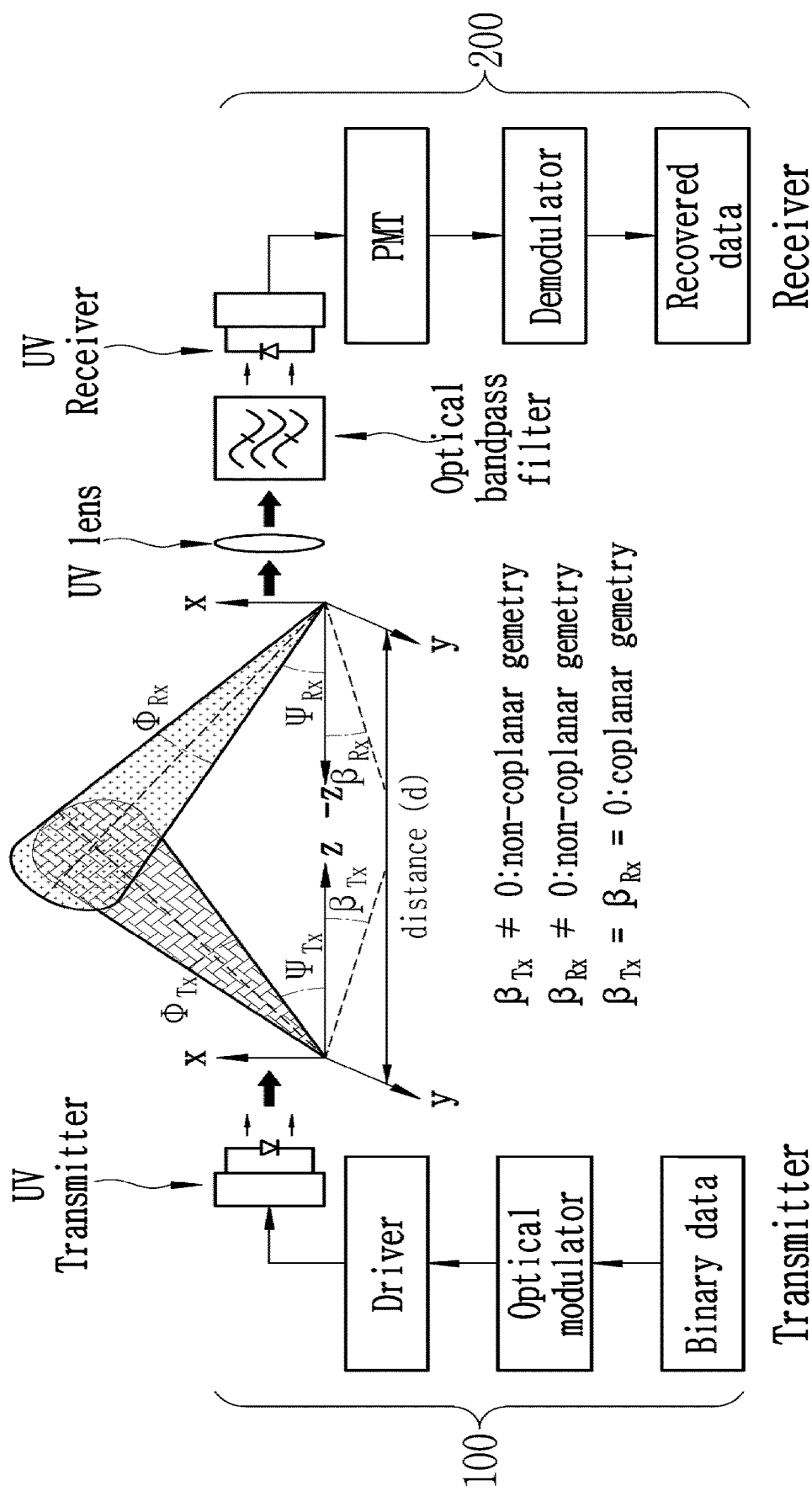
FIG. 1 is a configuration diagram of a system for vehicle-to-vehicle radio communication using an ultraviolet C band according to the present disclosure.
Figure 2:
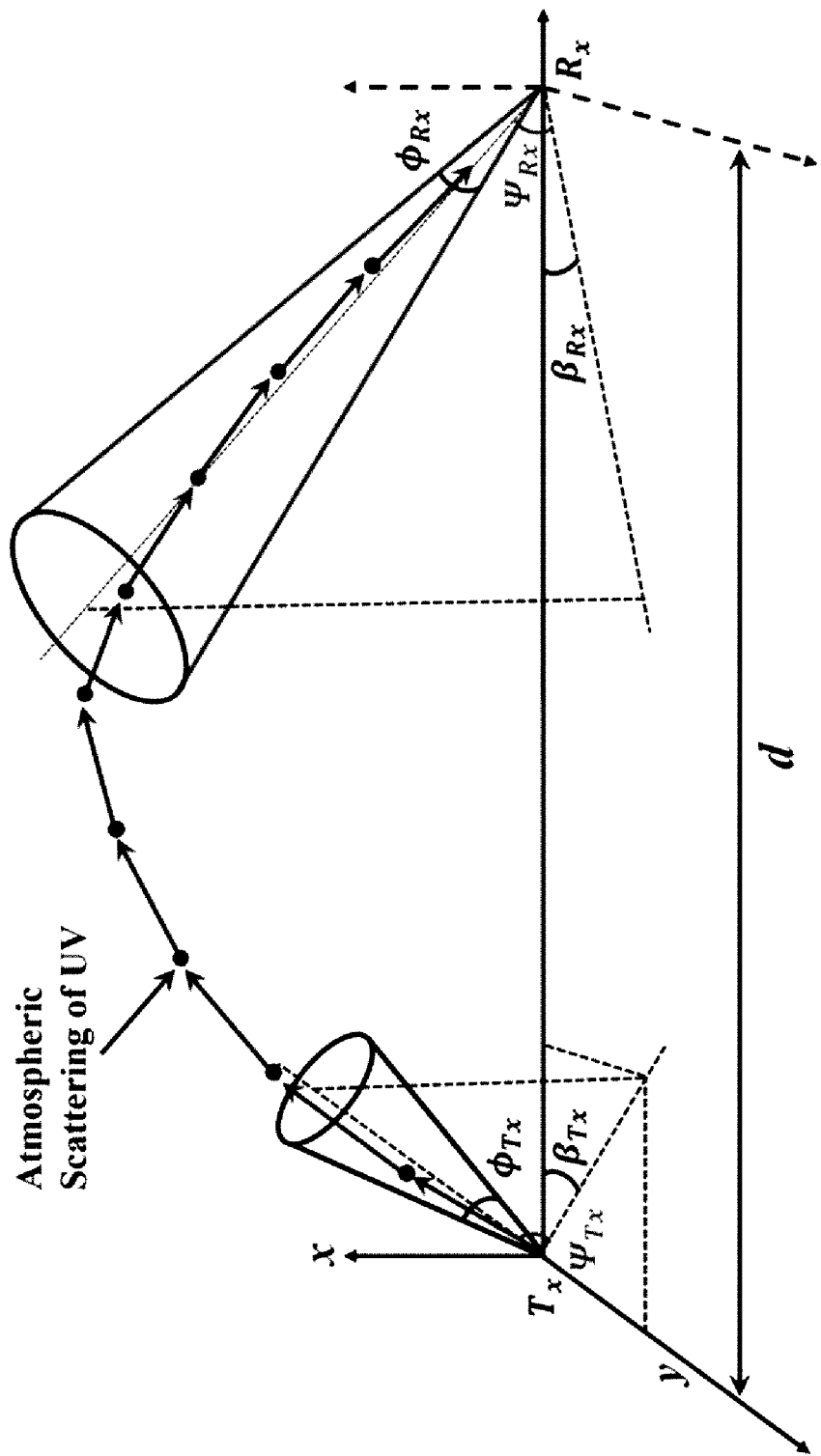
FIG. 2 is a configuration diagram illustrating a scheme for vehicle-to-vehicle radio communication using an ultraviolet C band according to the present disclosure.

FIG. 2 is a configuration diagram of a system for vehicle-to-vehicle radio communication using an ultraviolet C band according to the present disclosure.

The terms used in the present disclosure adopt general terms which are currently widely used to describe the functions in the present disclosure, but the terms may be changed depending on the intention of those skilled in the art, a precedent, the emergence of new technology, etc. Further, in a specific case, a term that an applicant arbitrarily selects is present and in this case, the meaning of the term will be disclosed in detail in a corresponding description part of the invention. Accordingly, a term used in the present disclosure should be defined based on not just the name of the term but the meaning of the term and its contents throughout the present disclosure.

Further, throughout the specification, unless explicitly described to the contrary, the word "comprise" and variations such as "comprises" or "comprising", will be understood to imply the inclusion of stated elements but not the exclusion of any other elements. In addition, terms including "part', "module", and the like disclosed in the specification mean a unit that processes at least one function or operation and this may be implemented by hardware or software or a combination of hardware and software.

In particular, units that process at least one function or operation may be implemented as an electronic device comprising at least one processor, and at least one peripheral device may be connected to the electronic device according to a method for processing a function or operation. The peripheral devices may include a data input device, a data output device, and a data storage device.

The system and the method for vehicle-to-vehicle radio communication using an ultraviolet C band according to the present disclosure enable vehicle-to-vehicle communication by a wireless communication scheme using an ultraviolet C band (200 to 280 nm) where there is no interference from the light of the sun to enhance safety of a vehicle operation.

To this end the present disclosure may include a configuration that can implement a new vehicle-to-vehicle communication scheme using the ultraviolet C band by utilizing an advantage in that transmission/reception is enabled by a low-power and subminiature transceiver.

The present disclosure may characterize time-frequency selective fading and include pathloss modeling and time-variance dynamic channel phenomenon estimation technology in order to secure the robustness of ultraviolet ray based vehicle-to-vehicle communication through a low-cost, high-efficiency, and subminiature transceiver.

The present disclosure may include a configuration that implements a laser diode of an ultraviolet C band wavelength as a transmitter, and sets an efficient non-line-of-sight (NLOS) communication link by using a photon multiplier tube (PMT) as a receiver positioned in a vehicle.

The present disclosure may include a configuration for alleviating basic requirements of pointing, acquisition, and tracking (PAT) which can be frequently shown in free space optical V2V communication by applying Kalman filtering for time-variance delay estimation, and providing a low-cost and low-power solution to the optical V2V communication.

The system for vehicle-to-vehicle radio communication using an ultraviolet C band according to the present disclosure includes a transmission system and a reception system for a vehicle for NLOS transmission, and a Kalman filtering algorithm for estimating time delay statistics of a UV V2U channel (filter unit).

Specifically, the system for vehicle-to-vehicle radio communication using an ultraviolet C band according to the present disclosure includes a transmitter 100 including a data input processing unit processing binary data for data transmission and an optical modulator performing optical modulation for signal transmission, and a driving unit capable of transmitting an optical signal modulated by the optical modulator and a UV transmission unit transmitting a signal for vehicle-to-vehicle radio communication using the ultraviolet C band, and a receiver 200 including an optical bandpass filter filtering an optical signal received through a UV lens and a photo multiplier tube (PMT) converting the optical bandpass filtered optical signal into a photon signal and a demodulator demodulating the photo conversion signal and a data recovery unit recovering data.

Here, the photon multiplier tube (PMT) may have, for example, a structure having a photocathode converting light into photons, a focusing electrode, an electron multiplier diode, and an anode serving to collect electrons, which are mounted inside a vacuum tube, and is not limited thereto.

When light is incident on a photocathode, photons are emitted from the photocathode to the vacuum, and the photons are induced to the diode by a high voltage applied to the focusing electrode and multiplied by secondary electron emission, and the electrons multiplied by the diode are collected in the anode as an output signal.

The PMT has noise characteristics such as the most excellent sensitivity among the optical detectors used for measurement of ultraviolet, visible, and near-infrared light because the photons are multiplied by a secondary electron emission effect, and an advantage in that high-speed response characteristics and a light detection area may be increased.

In order to configure the system for vehicle-to-vehicle radio communication using an ultraviolet C band, as an example, the system includes Q-switch quaternary harmonic wave neodymium-doped yttrium aluminum garnet (ND:YAG) having a nominal center wavelength of 266 nm mounted on a corrected plate.

In addition, as an example, the average optical output of the ND:YAG is 3.3 mJ, the overall angle beam width is 3 mrad, and the nominal pulse width of the transmitter is 3 ns.

In addition, as an example, the Hamamatsu H10304 photon multiplier tube (PMT) is adopted and sealed in a shielding box integrated with a UV optical filter. A response time is 6 nm.

In addition, the receiver is configured by a customized high-gain (approximately 34 dB) 1.5-Ghz preamplifier. A filter may be disposed of in front of a sensing window of the PMT module.

Figure 3:
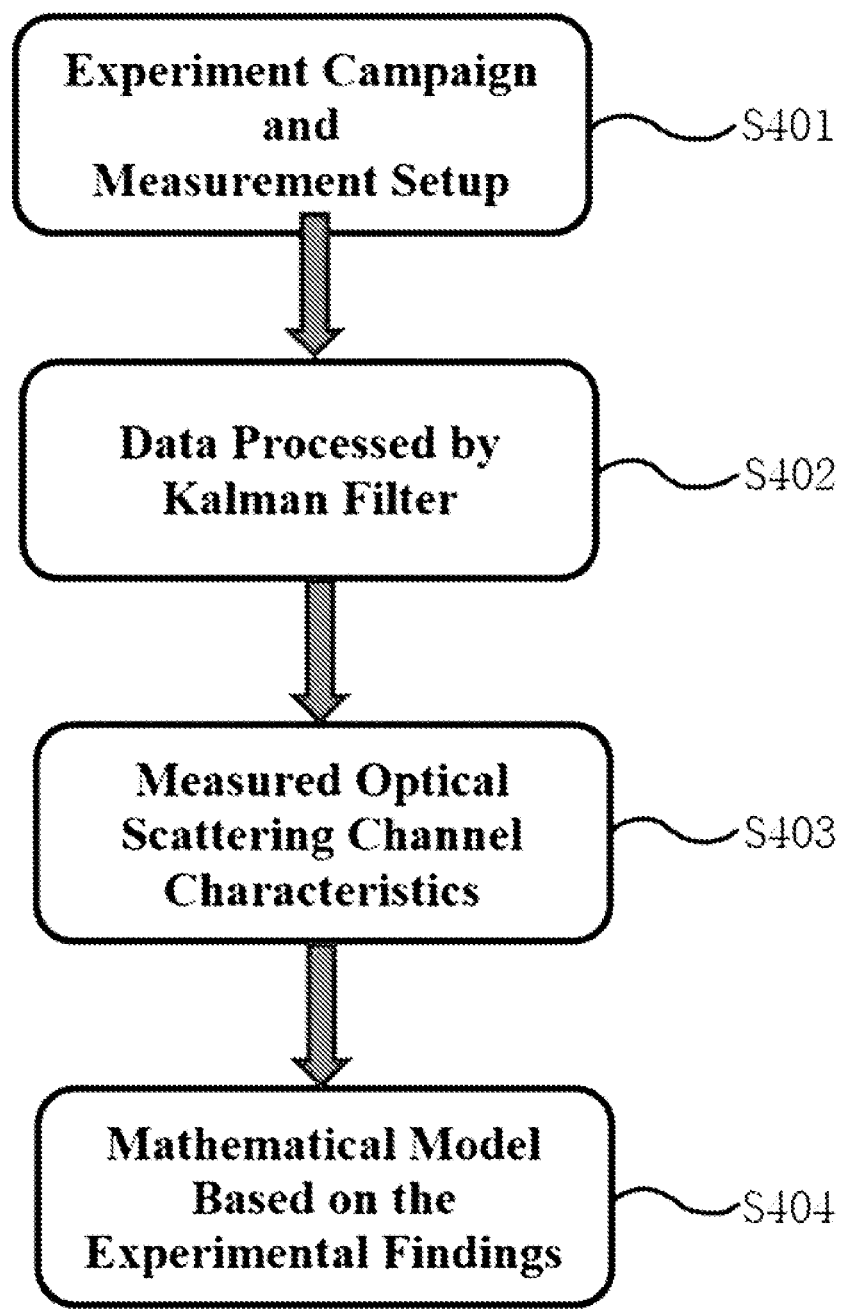
FIG. 3 is a flowchart illustrating a method for vehicle-to-vehicle radio communication using an ultraviolet C band according to the present disclosure.

FIG. 2 is a configuration diagram illustrating a scheme for vehicle-to-vehicle radio communication using an ultraviolet C band according to the present disclosure, and FIG. 3 is a flowchart illustrating a method for vehicle-to-vehicle radio communication using an ultraviolet C band according to the present disclosure.

The present disclosure adopts the following approach in order to build a mathematical model.

First, an experimental campaign with the measurement setup established is performed (S401).

In addition, data is processed by a 2-stage Kalman strengthened super-resolution tracking algorithm (S402).

Subsequently, channel characteristics of different sites are measured, and an optical scattering signal is tracked over a long period of time. In addition, a conclusion for a basic radio wave mechanism of an optical scattering based V2V communication link proposed is derived by analyzing a measurement result (S403).

In addition, optimal conformity between measured data and a model is determined (S404).

Figure 4:
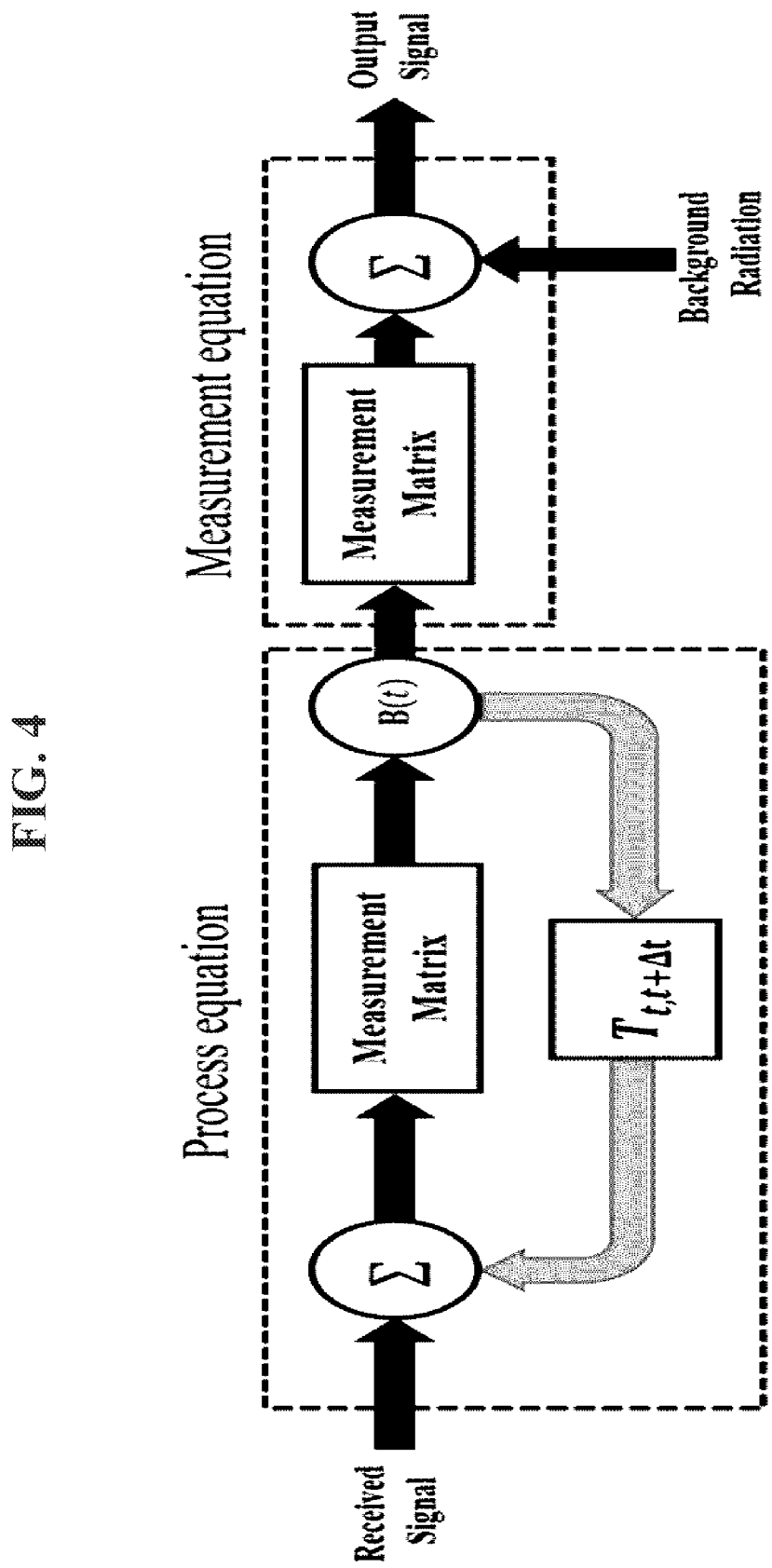
FIG. 4 is a configuration diagram illustrating a Kalman filtering method using data measurement according to the present disclosure.

FIG. 4 is a configuration diagram illustrating a Kalman filtering method using data measurement according to the present disclosure.

The present disclosure provides a Kalman filtering method using data measurement. According to the present disclosure a Kalman filtering method for estimation of time delay statistics is provided.

For data processing, the Kalman strengthened super-resolution tracking algorithm of process equation and measurement equation is applied.

Figure 5:
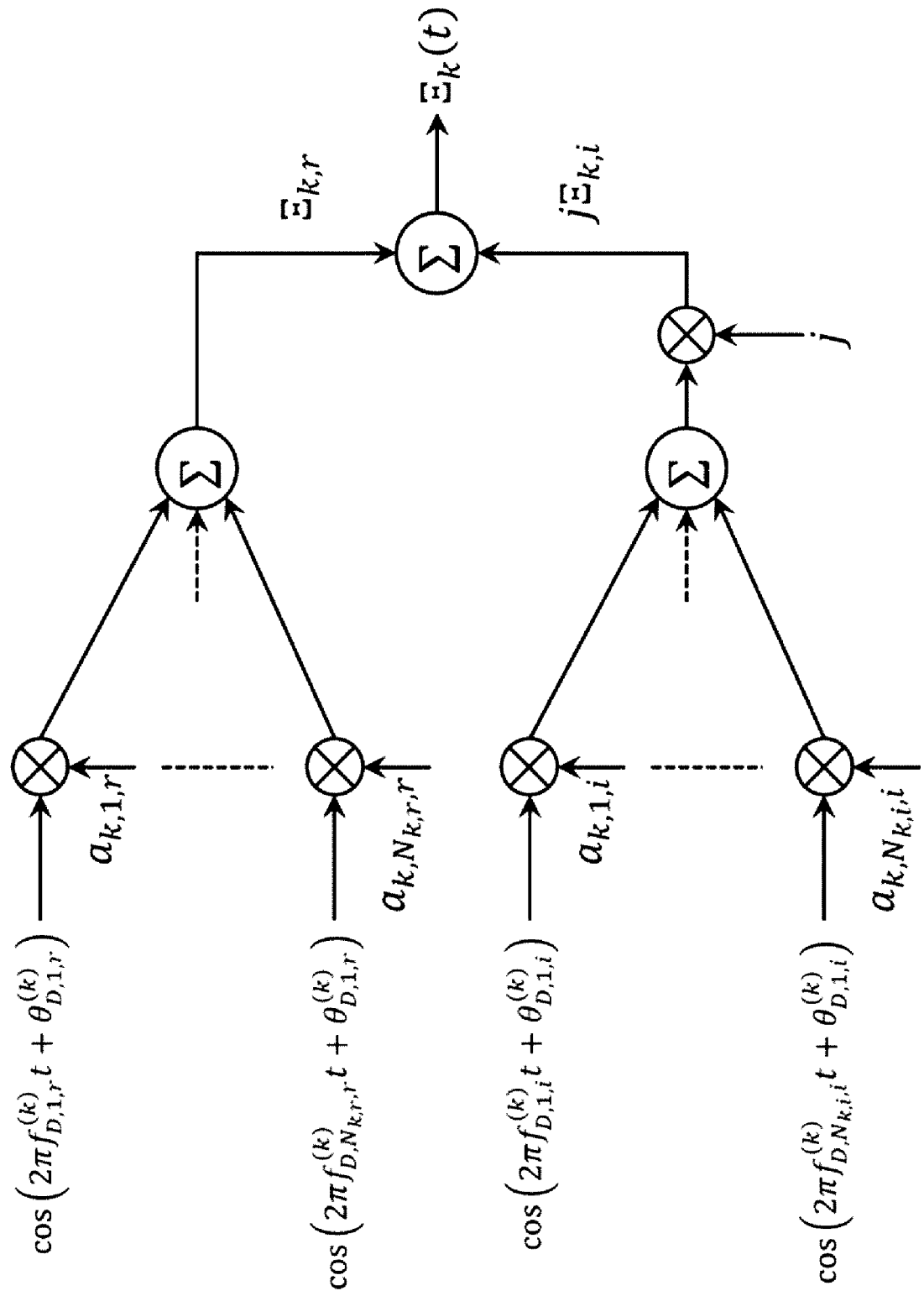
FIG. 5 is a configuration diagram illustrating a channel response simulation procedure.

FIG. 5 is a configuration diagram illustrating a channel response simulation procedure, and FIG. 6 is an expression configuration diagram of a baseband of a channel in the present disclosure.

In the present disclosure, a procedure for obtaining statistics of large-scale fading is as follows.

First, an average of a reception power for each moment is calculated as follows.

$$P_{avg} = \frac{1}{T} \sum_{t=1}^{T} |H[t, f]|^2 \quad \text{[Equation 1]}$$

Where $|H[t,f]|$ represents a recorded frequency response.

Thereafter, an average for small-scale fading is additionally calculated by using a movement window over $T_{avg}$ as follows.

$$P_r(t) = \frac{1}{T_{avg}} \sum_{t'=t-T_{avg}/2}^{t+T_{avg}/2} |H[t', f]|^2 \quad \text{[Equation 2]}$$

Where $P_r(t)$ represents a reception power after averaging the small-scale fading.

Selection of $T_{avg}$ still follows a slow change induced by movement of the vehicle to average the small-scale fading.

Last, the large-scale fading $F_{Large-scale}(t,f)|_{dB}$ is acquired as follows by the fluctuation of $P_r|_{dB}$ around the average.

$$F_{Large-scale}(t,f)|_{dB}=P_r|_{dB}-E_t\{P_r|_{dB}\} \quad \text{[Equation 3]}$$

Where $E\{\cdot\}$ represents a sample average over a time axis.

The present disclosure uses the ultraviolet C band which is an unlicensed frequency band, and a cheap laser diode has been developed recently, and a high-sensitivity and high-efficiency photon multiplier tube (PMT) is developed as a receiving device, so it is determined that commercialization of ultraviolet based vehicle-to-vehicle communication through a low-cost, high-efficiency, and subminiature transceiver will be possible.

The system and the method for vehicle-to-vehicle radio communication using an ultraviolet C band according to the present disclosure described above may implement a new vehicle-to-vehicle communication scheme using the ultraviolet C band by utilizing an advantage in that transmission/reception is possible by a low-power and subminiature transceiver, and enables vehicle-to-vehicle communication by the radio communication scheme using the ultraviolet C band (200 to 280 nm) where there is no interference from the light of the sum to enhance the safety of the vehicle operation.

As described above, it can be understood that the present disclosure can be implemented in a modified form in a scope without departing from the essential characteristics of the present disclosure.

Therefore, the specified exemplary embodiments should be considered from a described point of view, not a limited point of view, and the scope of the present disclosure is not described above, but in the claims, and it should be construed that all the differences within the same range are included in the present disclosure.

What is claimed is:

1. A system for vehicle-to-vehicle radio communication using an ultraviolet C band, the system comprising:
   a transmitter performing optical modulation for signal transmission when binary data for transmission is input, being driven to transmit the modulated optical signal, and transmitting a signal for vehicle-to-vehicle radio communication using an ultraviolet C band; and
   a receiver filtering an optical signal received through a UV lens, converting the filtered optical signal into a photon signal, and demodulating and recovering the photon signal,
   wherein the receiver applies Kalman filtering for time variable delay estimation in order to alleviate requirements of pointing, acquisition, and tracking (PAT) in free space optical V2V communication.

2. The system of claim 1, wherein the transmitter includes a data input processing unit processing binary data for data transmission,
   an optical modulator performing optical modulation for signal transmission,
   a driving unit allowing the optical modulator to transmit the modulated optical signal, and
   a UV transmission unit transmitting the signal for the vehicle-to-vehicle radio communication using the ultraviolet C band.

3. The system of claim 1, wherein the receiver includes an optical bandpass filter filtering the optical signal received through the UV lens,
   a photon multiplier tube (PMT) converting the optical bandpass filtered optical signal into the photon signal,
   a demodulation unit demodulating a photon conversion signal, and
   a data recovery unit recovering data.

4. The system of claim 1, wherein the transmitter includes Q-switch quaternary harmonic wave neodymium doped yttrium aluminum garnet (ND:YAG) having a nominal center wavelength of 266 nm mounted on a corrected plate, and
   an average optical output of ND:YAG is 3.3 mJ, an overall angle beam width is 3 mrad, and a nominal pulse width of the transmitter is 3 ns.

5. The system of claim 1, wherein the receiver adopts the Hamamatsu H10304 photon multiplier tube (PMT) and is sealed in a shielding box integrated with a UV optical filter, and has a response time of 6 nm.

6. The system of claim 1, wherein the receiver is configured by a 34 dB gain and 1.5 Ghz preamplifier, and a filter is disposed of in front of a sensing window of the PMT module.

7. A method for vehicle-to-vehicle radio communication using an ultraviolet C band, the method comprising:
   in order to build a mathematical model for vehicle-to-vehicle radio communication using an ultraviolet C band,
   performing an experimental campaign and measurement setup;
   processing data by a 2-stage Kalman strengthened super resolution tracking algorithm of a process equation and a measurement equation;
   measuring channel characteristics of different sites, and tracking an optical scattering signal over large time, and deriving a conclusion for a basic radio wave mechanism of an optical scattering based V2V communication link by analyzing a measurement result; and
   determining an optimal conformity between measured data and a model.

8. The method of claim 7, wherein in order to obtain statistics of large-scale fading,
   an average of a reception power for each moment is calculated as $$P_{avg} = \frac{1}{T}\sum_{t=1}^{T}|H[t,f]|^2,$$

where $|H[t,f]|$ represents a recorded frequency response.

9. The method of claim 8, wherein an average for small-scale fading is additionally calculated as $$P_r(t) = \frac{1}{T_{avg}}\sum_{t'=t-T_{avg}/2}^{t+T_{avg}/2}|H[t',f]|^2$$

by using a movement window over $T_{avg}$, and
   where $P_r(t)$ represents a reception power after averaging the small-scale fading, and selection of $T_{avg}$ still follows a slow change induced by movement of the vehicle to average the small-scale fading.

10. The method of claim 9, wherein the large-scale fading $F_{Large-scale}(t,f)|_{dB}$ is acquired as follows by fluctuation of $P_r|_{dB}$ around the average, and
   where $E\{\cdot\}$ represents a sample average over a time axis.

* * * * *